United States Patent
Ijiri et al.

(10) Patent No.: US 11,865,704 B2
(45) Date of Patent: Jan. 9, 2024

(54) JOINT STRUCTURE FOR ROBOT

(71) Applicant: OMRON Corporation, Kyoto (JP)

(72) Inventors: Yoshihisa Ijiri, Kyoto (JP); Kazutoshi Tanaka, Tokyo (JP); Felix Von Drigalski, Tokyo (JP); Masashi Hamaya, Tokyo (JP); Yoshiya Shibata, Kyoto (JP); Chisato Nakashima, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/921,918

(22) PCT Filed: May 10, 2021

(86) PCT No.: PCT/JP2021/017661
§ 371 (c)(1),
(2) Date: Oct. 27, 2022

(87) PCT Pub. No.: WO2021/241181
PCT Pub. Date: Dec. 2, 2021

(65) Prior Publication Data
US 2023/0173691 A1 Jun. 8, 2023

(30) Foreign Application Priority Data

May 29, 2020 (JP) .................................. 2020-094695
Dec. 16, 2020 (JP) .................................. 2020-208101

(51) Int. Cl.
*B25J 17/02* (2006.01)
(52) U.S. Cl.
CPC ..................... *B25J 17/02* (2013.01)
(58) Field of Classification Search
CPC ..... B25J 17/02; B25J 17/0208; F16M 13/022; F16C 11/10; F16C 11/103
(Continued)

(56) References Cited

U.S. PATENT DOCUMENTS 2,510,198 A * 6/1950 Tesmer .................. B25B 5/006
248/231.71
2,994,900 A * 8/1961 Smithers ............... B60S 1/3418
403/53
(Continued)

FOREIGN PATENT DOCUMENTS

JP S62121094 U 7/1987
JP S62188380 U 11/1987
(Continued)

OTHER PUBLICATIONS

International Search Report issued in Intl. Appln. No. PCT/JP2021/017661 dated Jun. 22, 2021. English translation provided.
(Continued)

*Primary Examiner* — William C Joyce
(74) *Attorney, Agent, or Firm* — ROSSI, KIMMS & McDOWELL LLP (57) ABSTRACT

A joint structure includes a locking mechanism for switching a free state in which a second element is independent from a first element and capable of moving, and a locked state in which the second element is fixed to the first element. The locking mechanism includes a first member joined to the first element, a second member joined to the second element, and a flexible wire-shaped member in which one end thereof is attached to the second member and another end thereof is led out to the outside of the joint structure via a through hole provided in the first member. The joint structure enters the locked state by the wire-shaped member being pulled to bring the second member into contact with the first member, and enters the free state by the wire-shaped member being fed to separate the second member from the first member.

9 Claims, 7 Drawing Sheets

(58) Field of Classification Search
USPC .......................................................... 403/113
See application file for complete search history.

(56) References Cited

U.S. PATENT DOCUMENTS

| | | | | |
|---|---|---|---|---|
| 3,546,961 | A | * 12/1970 | Theodore | .................. F16C 1/10 74/502.5 |
| 3,625,084 | A | * 12/1971 | Low | .......................... F16C 1/00 248/278.1 |
| 5,465,946 | A | * 11/1995 | Smith | ...................... B23Q 1/28 269/22 |
| 11,312,024 | B2 | * 4/2022 | Takagi | ................. B25J 17/0208 |

FOREIGN PATENT DOCUMENTS

| JP | S6347090 A | 2/1988 |
|---|---|---|
| JP | S6450081 U | 3/1989 |
| JP | H05192892 A | 8/1993 |
| JP | H05253879 A | 10/1993 |
| JP | H08118281 A | 5/1996 |

OTHER PUBLICATIONS

Written Opinion issued in Intl. Appln. No. PCT/JP2021/017661 dated Jun. 22, 2021. English translation provided.
Office Action issued in Taiwanese Appln. No. 110115586 dated Dec. 13, 2021. English translation provided.

* cited by examiner

JOINT STRUCTURE FOR ROBOT

TECHNICAL FIELD

The present invention relates to a joint structure of a robot, in particular, a joint structure that is suitable for a manipulator of a soft robot (flexible robot).

RELATED ART

In general, manipulators of industrial robots are configured using a highly rigid mechanism, and three-dimensional positions of end effectors are controlled while measuring their state with sensors. However, it is difficult for robots constituted by only highly rigid mechanisms to perform an operation accompanying contact with an object, and an operation that requires higher accuracy than a measurement error of a sensor, for example. As a measure to solve such a problem, an approach called a "soft robot" (flexible robot) has been proposed. For example, a flexible mechanism that is displaced or deformed by an external force is provided at a portion of a robot such that the mechanism automatically follows the shape of the object or the like. Compliance mechanisms disclosed in Patent Documents 1 and 2 are examples of such a mechanism.

RELATED ART DOCUMENTS

Patent Documents

Patent Document 1: Japanese Unexamined Patent Publication No. H5-192892
Patent Document 2: Japanese Unexamined Patent Publication No. H8-118281

SUMMARY OF THE INVENTION

Problems to be Solved by the Invention

Highly rigid mechanisms and soft mechanisms each have merits and demerits. Accordingly, the inventors of the present invention proceed with investigations in order to realize a hybrid mechanism capable of switching between a highly rigid mechanism and a soft mechanism. Note that in the compliance mechanisms proposed in Patent Documents 1 and 2 as well, a function is mounted for switching between a free state in which a compliance operation can be performed and a locked state in which a compliance operation cannot be performed. However, the movable ranges of the compliance mechanisms in Patent Documents 1 and 2 are very narrow (to an extent to which a subtle displacement on a horizontal plane can be made), and situations and applications in which the mechanisms can be used are restrictive. Further, since an actuator (e.g., air cylinder) for driving a locking mechanism is provided inside the joint, a link, or the like, there is also a disadvantage that the structures of the joint, link, or the like are made complex and larger.

The present invention was made in view of the above circumstances, and aims to provide a joint structure of a robot capable of switching between a locked state and a free state in which the movable range is large, with a simple and compact structure.

Means for Solving the Problems

The present disclosure is a joint structure for linking a first element and a second element of a manipulator of a robot to each other, the joint structure including a locking mechanism for switching a free state in which the second element is capable of moving independent from the first element, and a locked state in which the second element is fixed to the first element, and the locking mechanism includes a first member joined to the first element, a second member joined to the second element, and a flexible wire-shaped member, one end of which is attached to the second member and another end of which is led out to the outside of the joint structure via a through hole provided in the first member, and the joint structure enters the locked state by the wire-shaped member being pulled to bring the second member into contact with the first member, and enters the free state by the wire-shaped member being fed to separate the second member from the first member.

According to this structure, switching between the locked state and the free state can be realized with an extremely simple structure in which the wire-shaped member is pulled to bring the second member into contact with the first member/the wire-shaped member is fed to separate the second member from the first member. Further, since the other end of the wire-shaped member being led out to the outside of the joint structure, the driving source of the wire-shaped member can be disposed outside the joint structure. Accordingly, it is possible to form a compact lightweight joint structure. In addition, since the separation distance between the first member and the second member can be adjusted using the amount (stroke) by which the wire-shaped member is fed, it is possible to easily set the movable range between the first element and the second element to be as large as necessary.

A configuration is also possible in which, for example, in the free state, the second member is separate from the first member to such an extent that a movable range is formed in which the second element is capable of moving with six degrees of freedom independently from the first element. The motion in six degrees of freedom means translations in the x, y, and z directions, and rotations around the x, y, and z axes. "To an extent to which the second element is independent from the first element to form the movable range in which the second element is movable in six degrees of freedom" means, for example, "to an extent to which, when motion in the six degrees of freedom is allowed for the second element while the first element is fixed, the second element is not constrained by the first element or physically interfered with the first element". According to the locking mechanism in the present disclosure, by appropriately designing the amount (stroke) by which the wire-shaped member is fed and the shapes of the first member and the second member, such a large movable range can be easily formed.

A configuration is also possible in which an elastic member for connecting the first member and the second member to each other is further provided. Due to the action of the returning force of the elastic member, the relative orientation of the first element and the second element is stabilized in the free state as well. On the other hand, when an external force is applied to the second element, the elastic member is deformed and motion of the second element is not hindered. For this reason, for example, a soft motion such as moving the leading end of the second element so as to conform to an uneven surface can be easily realized.

A configuration is also possible in which the elastic member includes a nonlinear spring element, and the rigidity of the elastic member is capable of being changed by changing the distance between the first member and the second member depending on the amount by which the wire-shaped member is pulled. In this manner, the hardness (softness) of the joint structure in the free state can be controlled.

A configuration is also possible in which a protrusion is provided at one of the first member and the second member, and a recess is provided in another thereof, and in the locked state, the first member and the second member are fixed to each other by the protrusion being fitted to the recess. Such a fitting method is suitable to the case where a strong fixing force is required.

The protrusion may also have a conical shape or a truncated conical shape. In the other words, the side face may be inclined such that it narrows toward the leading end of the projection. Note that the recess may have a shape corresponding to the shape of the protrusion. According to this fitting structure having a protrusion and a recession, when the wire-shaped member is gradually pulled to move the first member and the second member closer to each other, the protrusion is guided by the inner surface of the recess, and automatically guided such that the axis of the protrusion matches the axis of the recess. Accordingly, a failure in fitting (failure in switching to the locked state) can be suppressed.

The protrusion may also have a circular conical shape or a circular truncated conical shape. By using the protrusion of the rotational symmetrical shape, angular deviation (rotation around the axis of the protrusion) between the first member (first element) and the second member (second element) is allowed, making it possible to further suppress a failure in fitting. Note that, a configuration is also possible in which a projection is provided on a side face of the protrusion, and a guide groove for guiding the projection is provided in the recess. According to this configuration, when the protrusion is inserted into the recess, the projection is guided by the guide groove, and angular deviation between the protrusion and the recess is automatically corrected. Accordingly, both suppressing a failure in fitting and prevention of angular deviation can be achieved.

Only one pair of the protrusion and the recess or a plurality of pairs of the protrusion and the recess may be provided.

A configuration is also possible in which, each of the first member and the second member is provided with a surface, the surfaces being parallel to each other, and in the locked state, the first member and the second member are fixed to each other by a friction that acts due to surface contact between the first member and the second member. Such a friction method is suitable in a case where the joint structure is required to be more compact.

The present invention may also be embodied as a joint structure of a robot including at least a portion of the above configuration, a locking mechanism for fixing an element of a manipulator of a robot, or a state switching device for switching between a free state and a locked state of an element of a manipulator of a robot. Also, the present invention may be embodied as a manipulator of a robot or a robot including such a joint structure, a locking mechanism, or a state switching device. Also, the present invention may be embodied as a locking method for fixing an element of a manipulator of a robot using the joint structure with the above configuration, a state switching method for switching between a free state and a locked state of an element of a manipulator of a robot, and the like. Note that the present invention can be configured by combining the constituent elements of the above configurations to each other as much as possible.

Effects of the Invention

According to the present invention, it is possible to provide a joint structure of a robot, capable of switching between a locked state and a free state in which the movable range is large, with a simple and compact structure.

EMBODIMENTS OF THE INVENTION

Application Example

Figure 1:
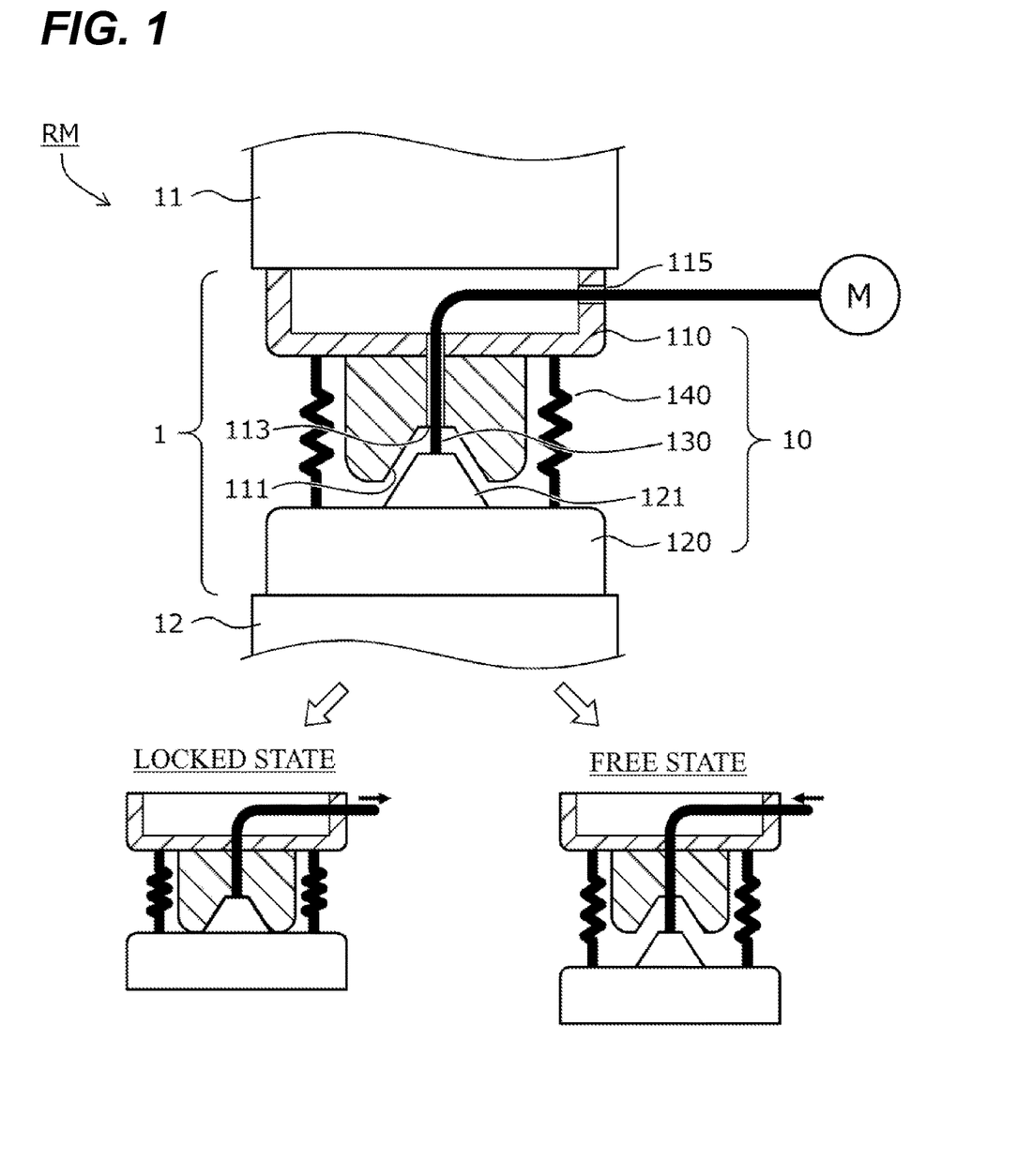
FIG. 1 is a schematic diagram of a joint structure having a locking mechanism.

One application example of the present invention will be described with reference to FIG. 1. FIG. 1 is a schematic view of a joint structure of a robot having a locking mechanism.

This joint structure 1 is a device for linking a first element 11 and a second element 12 that are part of a manipulator RM of a robot. The manipulator RM is a multi-joint manipulator, the first element 11 is an element located on the base end side of the manipulator RM, and the second element 12 is an element located on the leading end side relative to the first element 11.

The joint structure 1 can be in a free state in which the second element 12 is independent from the first element 11 and capable of moving, or a locked state in which the second element 12 is fixed to the first element 11. Switching between the free state and the locked state is realized by a locking mechanism 10.

Roughly, the locking mechanism 10 includes a first member 110 joined to the first element 11, a second member 120 joined to the second element 12, a flexible wire-shaped member 130, and a plurality of elastic members 140 for connecting the first member 110 and the second member 120.

A protrusion 121 is provided at the center portion of the second member 120, and a recess 111 formed in a shape corresponding to the protrusion 121 is provided at the center portion of the first member 110. A through hole 113 and a lead-out hole 115 for insertion of the wire-shaped member 130 are respectively formed in the bottom portion of the recess 111 and the side wall of the first member 110. One end of the wire-shaped member 130 is fixed to the top of the protrusion 121 (the center of the upper bottom) of the second member 120, and the other end thereof is led out to the outside of the joint structure 1 via the through hole 113 and the lead-out hole 115, thereby connecting it to a driving source M.

When the wire-shaped member 130 is pulled by the driving source M, the protrusion 121 is fitted to the recess 111, the second member 120 is fixed to the first member 110, and the joint structure 1 enters the locked state. In this locked state, the first element 11 and the second element 12 behave as one rigid body.

When the driving source M is turned off (or the wire-shaped member 130 is reeled out by the driving source M) to feed the wire-shaped member 130, the second member 120 is separated away from the first member 110, and the joint structure 1 enters the free state. "Feeding the wire-shaped member 130" means that, when the tension applied to the wire-shaped member 130 is loosened, at least one of the weight of the second element 12 and the returning force of the elastic members 140 (described later) that is compressed in the locked state increases the length by which the wire-shaped member 130 is let out toward the second member 120 from the through hole 113. In the free state, the second element 12 is independent from the first element 11 and capable of moving. In this manner, a so-called "flexible robot", which is referred to as a "soft robot", a "compliance mechanism", and the like, can be realized.

The driving source M may be a linear motor or a rotation motor. The driving source M may also be driven electrically or by fluid pressure. The driving source M may drive the wire-shaped member 130 such that the driving source M determines the length by which of the wire-shaped member 130 is led, instead of applying a pulling force to the wire-shaped member 130.

According to this configuration, switching between the locked state and the free state can be realized with a very simple structure in which the wire-shaped member 130 is pulled to bring the second member 120 into contact with the first member 110 or the wire-shaped member 130 is fed to separate the second member 120 from the first member 110. Also, by the other end of the wire-shaped member 130 led to the outside of the joint structure 1, the driving source M of the wire-shaped member 130 can be disposed outside the joint structure 1. Accordingly, the joint structure 1 can be configured to be compact and lightweight. In addition, since the separation distance between the first member 110 and the second member 120 can be adjusted using the amount (stroke) by which the wire-shaped member 130 is fed, there is another advantage that the movable range between the first element 11 and the second element 12 can be easily set to be as large as necessary.

Embodiment

Figure 2:
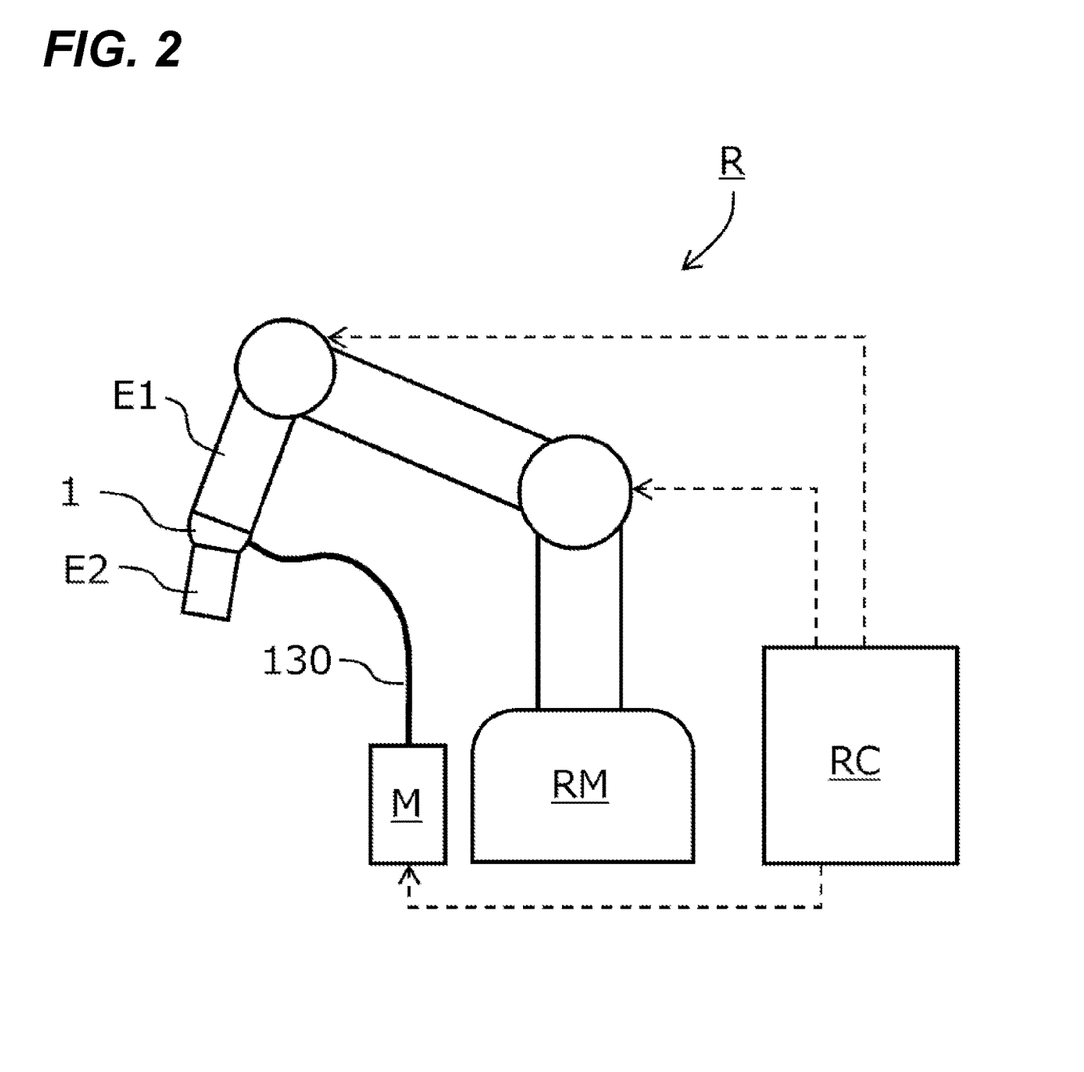
FIG. 2 is a schematic diagram showing an overall configuration of a robot.

A robot and a joint structure thereof according to an embodiment of the present invention will be described with reference to FIG. 2. FIG. 2 is a schematic diagram showing an overall configuration of a robot.

The present embodiment shows an example in which an end effector E2 is attached to a manipulator RM of a vertical multijoint robot R via a joint structure 1 provided with the abovementioned locking mechanism. Note that this is merely an example, and the configuration and type of the robot R are not limited to the example shown in FIG. 2. Specifically, the robot R may be any type of robot as long as it is provided with at least one manipulator, and can be applied to various kinds of robots such as industrial robots, humanoid robots, nursing-care robots, transfer robots, home robots, surgery-assistance robots, and the like. Among these, the industrial robots are one example of the robots to which the joint structure 1 can be favorably applied, because there are many applications where switching between a rigid robot and a soft robot is useful. Note that industrial robots include horizontal multijoint robots (scalar robots), parallel link robots, and orthogonal robots, as well as vertical multijoint robots. Also, the location where the joint structure 1 is applied is not limited to the linking portion of the end effector E2, and the joint structure 1 may also be applied to the linking portion between the links.

The robot R of the present embodiment is mainly constituted by the manipulator RM, a controller RC, and the driving source M. The manipulator RM is a multijoint manipulator that has a plurality of links and joints for linking the links, and is driven by a servo motor. The controller RC is a control device for controlling the servo motor and the driving source M of the manipulator RM.

The end effector E2 is linked to a link E1 at the leading end of the manipulator RM via the joint structure 1. In this example, the link E1 corresponds to the first element 11 in FIG. 1, and the end effector E2 corresponds to the second element 12 in FIG. 1. The driving source M is a device for driving the locking mechanism of the joint structure 1. The driving source M may be any type and configuration as long as it can operate to pull and reel out the wire-shaped member 130, but is required to have a pulling force of such an extent that the rigidity (fixing force between the link E1 and the end effector E2) of the joint structure 1 in the locked state can be ensured, and a stroke of such an extent that the movable range of the end effector E2 when the joint structure 1 is in the free state can be ensured. A motor, a hydraulic actuator, and an air-pressure actuator, for example, can be used as the driving source M.

Figure 3A:
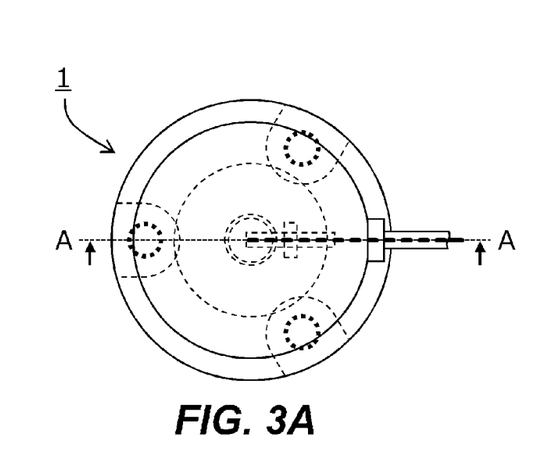
FIG. 3A is a plan view of the joint structure.
Figure 3B:
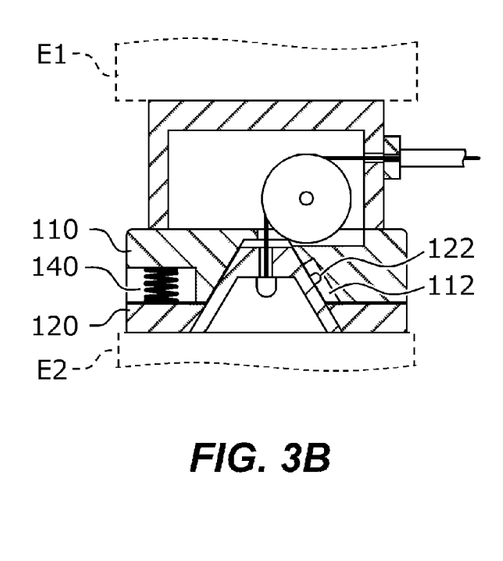
FIG. 3B is a cross sectional view (locked state) taken along line A-A in FIG. 3A.
Figure 3C:
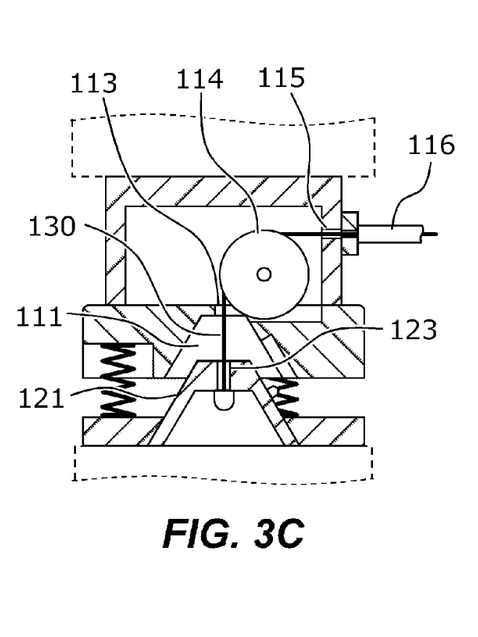
FIG. 3C is a cross sectional view (free state) taken along line A-A in FIG. 3A.
Figure 3D:
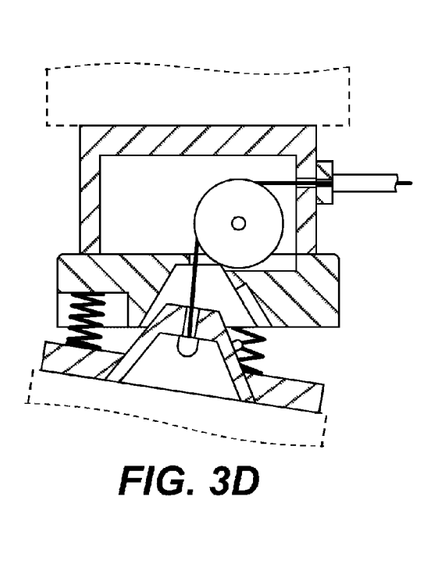
FIG. 3D is a diagram showing a motion when an external force is applied to an end effector in the free state.

The details of the joint structure 1 are shown in FIGS. 3A to 3D. FIG. 3A is a plan view of the joint structure 1 as seen from the link E1 side. FIG. 3B is a cross sectional view (of the locked state) taken along line A-A in FIG. 3A. FIG. 3C is a cross sectional view (of the free state) taken along line A-A in FIG. 3A. FIG. 3D is a diagram showing a motion when an external force is applied to the end effector E2 in the free state.

The joint structure 1 has a structure in which a first member 110 formed in an approximately cylindrical shape and a second member 120 formed in an approximately disc-like shape are linked with a plurality of elastic members 140. In the example of the present embodiment, the first member 110 and the second member 120 are concentrically arranged, and the two members 110 and 120 are linked by three coil springs arranged at equal intervals in the circumferential direction. In the locked state, the elastic members 140 are in a compressed state, and generate a returning force attempting to separate the first member 110 and the second member 120 from each other. When the second member 120 is below the first member 110, the force attempting to separate the first member 110 and the second member 120 from each other is also generated due to the weight of the second member 120.

A protrusion 121 that has a truncated conical shape is provided at the center portion of the second member 120, and a projection (locking pin) 122 is provided on a side face of the protrusion 121. A through hole 123 is formed in the upper bottom of the protrusion 121, and one end of the wire-shaped member 130 is inserted and fixed to the through hole 123. In the present embodiment, a metal wire is used as the wire-shaped member 130. Note that a cable (rope) made of chemical fibers or natural fibers may also be used as the wire-shaped member 130.

A recess 111 that has a shape corresponding to the protrusion 121 is provided in the center portion of the first member 110, and a guide groove 112 for guiding and positioning the projection 122 is provided in a side surface of the recess 111. A through hole 113 is formed in the bottom of the recess 111. The wire-shaped member 130 is passed through the through hole 113, rounded around a pulley 114 provided in the hollow inside the first member 110, and led out to the outside of the joint structure 1 from the lead-out hole 115 formed in a side wall of the first member 110. Note that the wire-shaped member 130 is passed through a flexible tube (outer casing) 116 attached to an outer wall of the first member 110, and is connected to the driving source M. Of the route of the wire-shaped member 130 extending between the joint structure 1 and the driving source M, at least a portion of the wire-shaped member 130 that curves is passed through the non-stretchable flexible tube 116 with the positions of the two ends thereof being fixed. In the state where a tension is applied to the wire-shaped member 130, a portion of the wire-shaped member 130 in the joint structure 1 is displaced in accordance with displacement of a portion of the wire-shaped member 130 in the driving source M.

While operating the robot R, the driving source M pulls the wire-shaped member 130 to move the second member 120 toward the first member 110 until the second member 120 comes into contact (abuts) with the first member 110. By doing so, the protrusion 121 is fitted to the recess 111, the second member 120 is positioned and locked to the first member 110, and enters the locked state (FIG. 3B). In this locked state, the link E1 and the end effector E2 behave as one rigid body.

On the other hand, when the driving source M is turned off (or the wire-shaped member 130 is sent out by the driving source M) and the wire-shaped member 130 is fed, the second member 120 is separated from the first member 110 due to the weight of the second member 120 and the end effector E2 or the returning force of the elastic members 140, and the joint structure 1 enters the free state (FIG. 3C). In the free state, the end effector E2 is suspended or supported by the three coil springs, independent from the link E1, and capable of moving in the six degrees of freedom. Motion in six degrees of freedom includes translations in the x, y, and z directions and rotations around the x, y, and z-axes (the xyz coordinate system of the joint structure 1 may be set such that the axial direction of the first member 110 (i.e., the link E1) is the z axis, for example.) At this time, when an external force is applied to the end effector E2, only the position and orientation of the end effector E2 can be changed as shown in FIG. 3D. In this manner, a so-called "flexible robot", which is also called a "soft robot" or "compliance mechanism", can be realized.

According to the joint structure 1 of the present embodiment described above, switching between the locked state and the free state can be realized with an extremely simple configuration. Also, since the driving source M of the wire-shaped member 130 is disposed outside of the joint structure 1, the joint structure 1 can be configured to be compact and lightweight. Further, the movable range of the end effector E2 in the free state can be easily set to be large.

Further, due to the action of the returning force of the elastic members 140, the relative orientation of the link E1 and the end effector E2 can be stabilized in the free state as well. On the other hand, when an external force is applied to the end effector E2, since the elastic members 140 are deformed, the motion of the end effector E2 is not hindered. Accordingly, a flexible motion such as moving the leading end of the end effector E2 along an uneven surface can be easily realized.

Also, according to the fitting structure formed by the truncated conical protrusion 121 and the recess 111, when the wire-shaped member 130 is gradually pulled to move the first member 110 and the second member 120 closer to each other, the protrusion 121 is guided by the inner surface of the recess 111, and automatically guided such that the axis of the protrusion 121 is aligned with that of the recess 111. Accordingly, a failure in the fitting (failure in switching to the locked state) can be suppressed. In addition, when the protrusion 121 is fitted to the recess 111, a strong fixing force can be obtained.

Further, since the projection 122 is provided at the protrusion 121 and the guide groove 112 is provided in the recess 111, when the protrusion 121 is inserted into the recess 111, the projection 122 is guided by the guide groove 112, and angular deviation between the protrusion 121 and the recess 111 is automatically corrected. Accordingly, both suppression of a failure in fitting and prevention of angular deviation can be achieved.

<Variations>

The above embodiments are merely an exemplification of the configuration examples of the present invention. The present invention is not limited to the specific modes described above, and various modifications are possible within the technical scope thereof.

Figure 4:
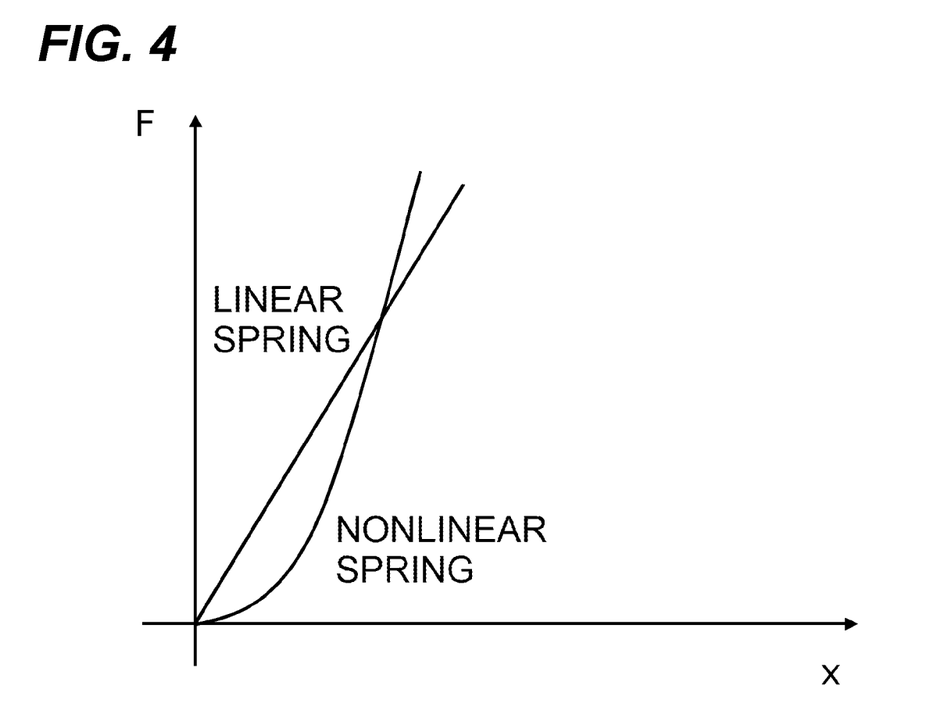
FIG. 4 is a diagram showing characteristics of a nonlinear spring used in a first variation.

In a first variation, nonlinear spring elements are used as the elastic members 140. FIG. 4 is a graph showing the difference in characteristics of a linear spring and a nonlinear spring, where the horizontal axis indicates displacement (bend), and the vertical axis indicates the load. In a linear spring, the load and displacement are in direct proportion, and the rigidity (spring constant) is constant regardless of the displacement. On the other hand, a nonlinear spring exhibits characteristics in which the larger the displacement is, the greater the rigidity (spring constant) is. Such nonlinear characteristics can be realized by a method such as setting the diameters of the coil springs uneven, setting the pitches of the coil springs unequal, or setting the wire-shaped diameters of the coil springs uneven.

A configuration is also possible in which, for example, by controlling the driving source M, the amount by which the wire-shaped member 130 is fed in the free state is switched between multiple stages such as s1 [mm], s2 [mm], and s3 [mm] (s1<s2<s3) such that the separation distance (i.e., displacement of the spring) between the first member 110 and the second member 120 is changeable. In this manner, the rigidity (flexibility) of the joint structure 1 in the free state can be controlled. It is expected that enlargement of the application range and efficient motion of a robot can be realized by adjusting the joint structure 1 to have an appropriate rigidity (flexibility), for example, in accordance with the operation of the robot and the scene.

Figure 5:
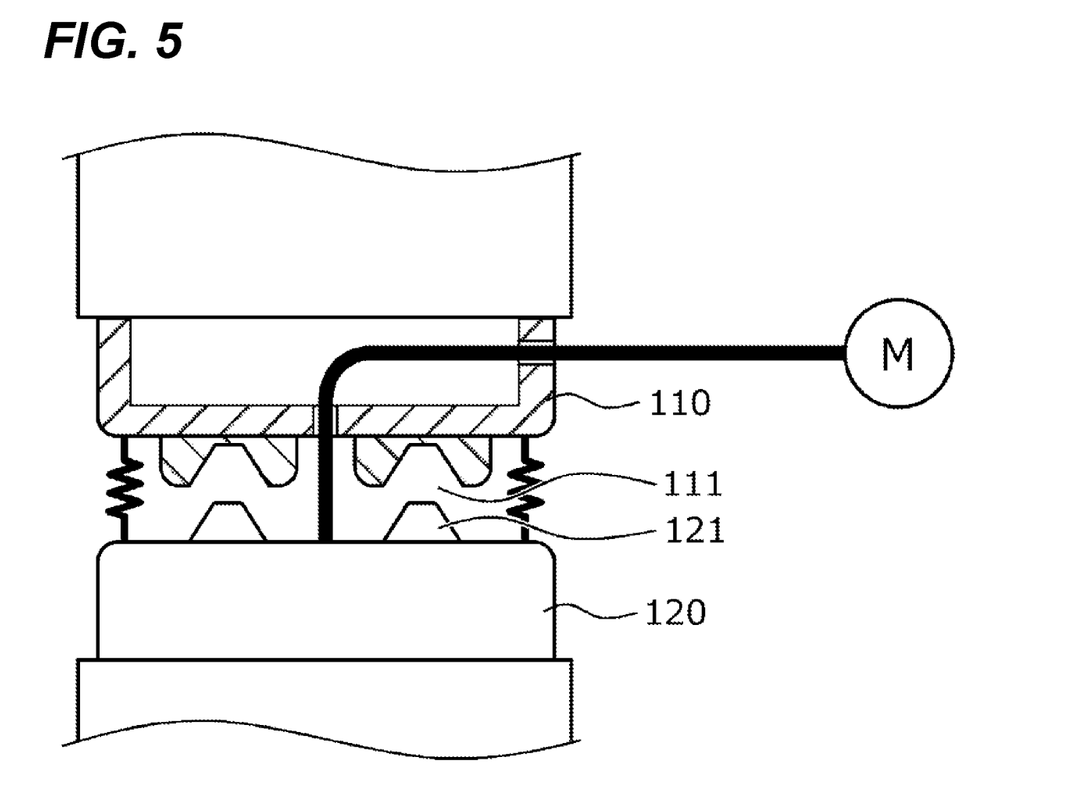
FIG. 5 is a diagram showing a second variation.

FIG. 5 shows a second variation. In the second variation, a plurality of fitting structures each formed by a pair of the protrusion 121 and the recess 111 are provided. By the first members 110 being fitted to the second members 120 at a plurality of locations, improvement in the accuracy of the relative positioning of the first members 110 and the second members 120, the fixing force between the first members 110 and the second members 120, and the like can be expected. Note that the shape and size of the protrusions and recesses may be in common or different in all the fitting structures.

Figure 6:
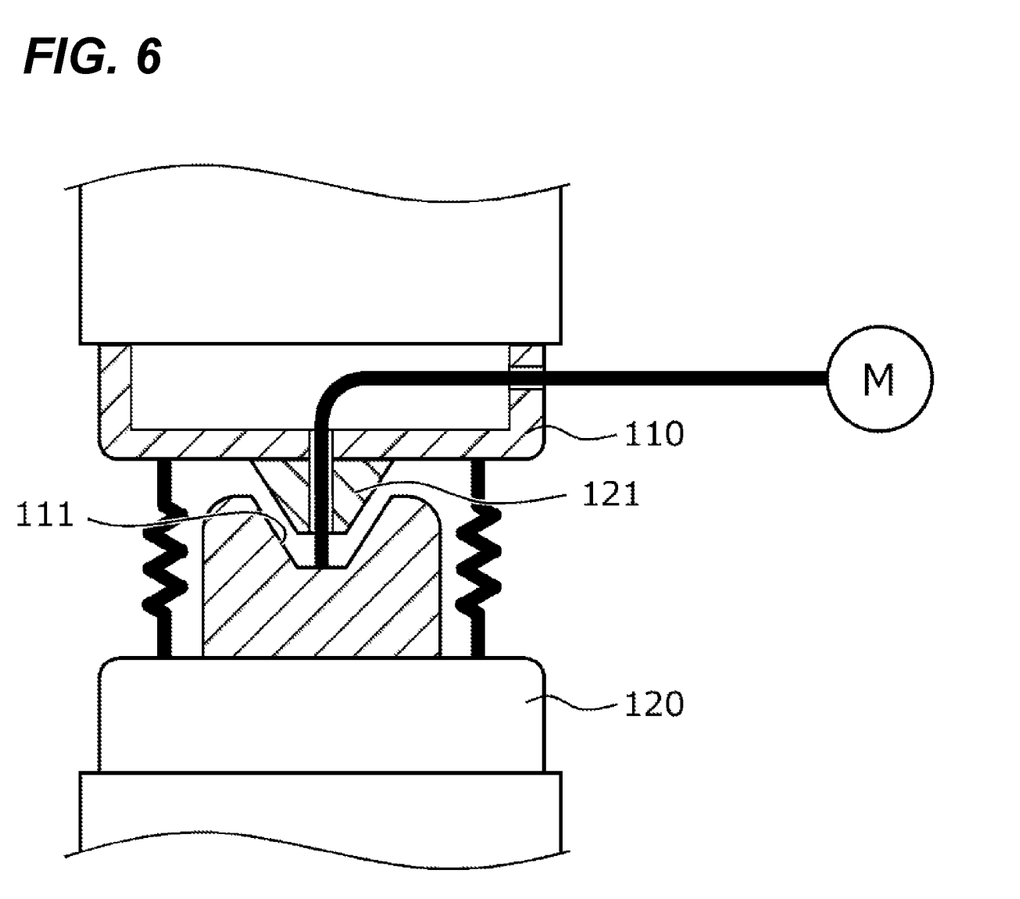
FIG. 6 is a diagram showing a third variation.

FIG. 6 shows a third variation. In the third variation, the protrusion and recess of the fitting structure are inverted relative to that of the embodiment. In other words, the protrusion 121 is provided on the first member 110, and the recess 111 is provided in the second member 120. Even if the positions of the protrusion and recess are inverted in this manner, the same operation and effects as the embodiment can be achieved. Note that if a plurality of fitting structures are provided as in the second variation, the fitting structures having different orientations of the protrusion and recess may also be mixed.

Figure 7:
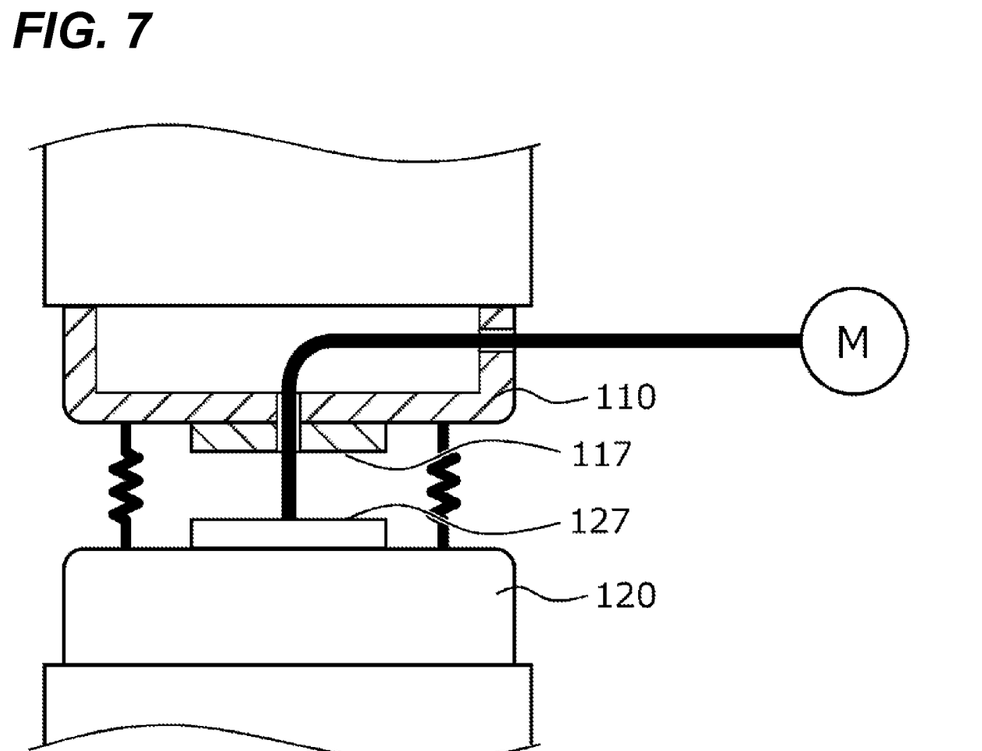
FIG. 7 is a diagram showing a fourth variation.

FIG. 7 shows a fourth variation. In the fourth variation, a friction type locking mechanism is adopted instead of the fitting type. Specifically, surfaces 117 and 127 that face each other in parallel are respectively provided to the first member 110 and the second member 120. In the locked state, the first member 110 and the second member 120 are fixed to each other by a friction that acts due to surface contact between the surface 117 of the first member 110 and the surface 127 of the second member 120. According to this friction type, since there is no need to provide the recess and protrusion for fitting the first member 110 to the second member 120, the joint structure 1 can be made more compact. Note that in order to achieve a sufficient friction force, materials having a high static frictional coefficient may be selected for the surfaces 117 and 127, or surface treatment for improving the static frictional coefficient may be applied on the surfaces 117 and 127.

Although the coil springs are used as the elastic members 140 in the above embodiment, another type of an elastic element (e.g., a dumper) may also be used. Alternatively, a configuration is also possible in which no elastic member 140 is provided between the first member 110 and the second member 120. In this configuration, by using the wire-shaped member 130 having a certain stiffness, the orientation of the second member 120 in the free state may also be stabilized by the wire-shaped member 130.

APPENDIX 1

(1) A joint structure (1) for linking a first element (11) and a second element (12) of a manipulator (RM) of a robot (R) to each other, the joint structure (1) including:
a locking mechanism (10) for switching between a free state in which the second element (12) is independent from the first element (11) and capable of moving, and a locked state in which the second element (12) is fixed to the first element (11),
    wherein the locking mechanism (10) includes:
    a first member (110) joined to the first element (11);
    a second member (120) joined to the second element (12); and
    a flexible wire-shaped member (130) in which one end thereof is attached to the second member (120) and another end thereof is led out to the outside of the joint structure (1) via a through hole (113) provided in the first member (110), and
    the locking mechanism (10)
    enters the locked state by the wire-shaped member (130) being pulled to bring the second member (120) into contact with the first member (110), and enters the free state by the wire-shaped member (130) being fed to separate the second member (120) from the first member (110).

| LIST OF REFERENCE NUMERALS | | | |
|---|---|---|---|
| 1 joint structure | | | |
| 10 locking mechanism, | 11 first element, | 12 second element | |
| 110 first member, | 111 recess, | 112 guide groove, | |
| 113 through hole, | 114 pulley, | 115 lead-out hole, | 117 surface |
| 120 second member, | 121 protrusion, | 122 projection, | |
| 123 through hole, | 127 surface | | |
| 130 wire-shaped member, | 140 elastic member | | |
| E1 link, | E2 end effector | | |
| R robot, | RM manipulator, | RC controller, | M driving source |

The invention claimed is:

1. A joint structure for linking a first element and a second element of a manipulator of a robot to each other, the joint structure comprising:
    a locking mechanism for switching between a free state, in which the second element is capable of moving independently from the first element, and a locked state, in which the second element is fixed to the first element,
    wherein the locking mechanism includes:
        a first member joined to the first element;
        a second member joined to the second element;
        a flexible wire-shaped member, one end of which is attached to the second member and another end of which is led out to an outside of the joint structure via a through hole provided in the first member; and
        an elastic member connecting the first member and the second member to each other, and
    the joint structure
        enters the locked state by the wire-shaped member being pulled to bring the second member into contact with the first member, and
        enters the free state by the wire-shaped member being fed to separate the second member from the first member, wherein, in the free state, the second member is suspended by the elastic member connecting the first member and the second member to each other.

2. The joint structure according to claim 1, wherein, in the free state, the second member is separate from the first member to such an extent that a movable range is formed in which the second element is capable of moving with six degrees of freedom independently from the first element.

3. The joint structure according to claim 1, wherein the elastic member includes a nonlinear spring element, and
    a rigidity of the elastic member is capable of being changed by changing a distance between the first member and the second member depending on an amount by which the wire-shaped member is fed.

4. The joint structure according to claim 1, wherein a protrusion is provided at one of the first member and the second member, and a recess is provided in another of the first member and the second member, and
    in the locked state, the first member and the second member are fixed to each other by the protrusion being fitted to the recess.

5. The joint structure according to claim 4,
wherein the protrusion has a conical shape or a truncated conical shape.
6. The joint structure according to claim 5,
wherein the protrusion has a circular conical shape or a circular truncated conical shape.
7. The joint structure according to claim 6,
wherein a projection is provided on a side face of the protrusion, and a guide groove for guiding the projection is provided in the recess.
8. The joint structure according to claim 4,
wherein a plurality of pairs of the protrusion and the recess are provided.
9. The joint structure according to claim 1,
wherein each of the first member and the second member is provided with a surface, the surfaces being parallel to each other, and
in the locked state, the first member and the second member are fixed to each other by a friction that acts due to surface contact between the first member and the second member.

\* \* \* \* \*